United States Patent [19]

Flint et al.

[11] Patent Number: 4,984,369
[45] Date of Patent: Jan. 15, 1991

[54] DEVICE FOR REMOVING GROUT

[76] Inventors: Matthew L. Flint; Glenda S. Flint, both of 4021 Valley Dr., Pueblo, Colo. 81008

[21] Appl. No.: 480,318

[22] Filed: Feb. 15, 1990

[51] Int. Cl.⁵ .................... B23D 47/02; B23D 51/02
[52] U.S. Cl. ................................... 30/374; 30/375
[58] Field of Search ............... 30/185, 243, 374, 375, 30/376, 377; 52/744

[56] References Cited

U.S. PATENT DOCUMENTS

| | | | |
|---|---|---|---|
| 4,250,624 | 2/1981 | Partington | 30/374 |
| 4,334,356 | 6/1982 | Krosunger | 30/374 |
| 4,373,264 | 2/1983 | Hamaker | 30/374 |
| 4,913,204 | 4/1990 | Moores | 30/377 |
| 4,922,616 | 5/1990 | Bensel | 30/374 |

Primary Examiner—Douglas D. Watts
Assistant Examiner—Paul M. Heyrana
Attorney, Agent, or Firm—Norman B. Rainer

[57] ABSTRACT

A device is provided for attachment to an electrically powered jig saw for the purpose of removing hardened grout from the spaces between adjacent coplanar tiles. The device translates the reciprocal vertical motion of the jig saw to reciprocal motion of a horizontal bar which causes a cutting blade to oscillate in a vertical plane upon a pivot pin transversely penetrating a yoke that supportively embraces the cutting blade.

5 Claims, 2 Drawing Sheets

DEVICE FOR REMOVING GROUT

BACKGROUND OF THE INVENTION

This invention relates to the removal of hardened cementitious material, known as grout, disposed between adjacent coplanar tiles in a wall or floor surface, and more particularly concerns a grout-removing power driven tool.

In the restoration or removal of tiled surfaces, it is often necessary to remove the grout from between the tiles. In the case of rectangular tiles laid in a square pattern, the grout is disposed in straight line patterns between the tiles. Because the width of the lines of grout may range between about 1/16" and ¼", considerable precision is required in the removal method. Furthermore, good control is required of any tool employed in such application because slight misdirections can damage the tiles or cause breakage of the tool or tiles with consequent risk of injury to the operator.

A tool heretofore employed to remove grout disposed in straight lines between tiles is a manually operated device having a saw-like blade adapted to rest flat upon the line of grout. In use, the tool is manipulated in a back and forth motion while applying sufficient pressure upon the blade to reduce the grout to powder. A problem encountered with said prior manual device is that, at the end of each stroke, the powdered grout is compacted. Such compacting blocks or resists movement of the blade.

The use of a rapidly rotating device such as a rotary saw blade mounted in an electrically driven hand tool is undesirable because of the lack of control, and it high peripheral speed which presents potential danger from thrown fragments of tile or blade. Another generally available type of electrically powered hand tool is a jig saw or saber saw which drives a short saw blade in an up and down motion with respect to a motor-confining housing at variable rates up to 3,000 strokes per minute. Although the speed of the jig-saw blade can be controlled better than the speed of a rotary saw blade, the usual jig-saw motion is unsuited for use in grout removal because the depth of the grout layer is shallow generally less than ¼", and the substrate underlying the grout may be unyielding. Although specialized power tools have been disclosed for grout removal, such tools are expensive and lack the versatility generally sought in power tools.

It is accordingly an object of the present invention to provide a device for removal of grout disposed in a straight path between tiles.

It is another object of this invention to provide a device as in the foregoing object which avoids a motion that would compact powdered grout within said path.

It is a further object of the present invention to provide a device of the aforesaid nature which avoids a high peripheral speed and affords control and safety during use.

It is still a further object of this invention to provide a device of the aforesaid nature which can be attached to a conventional electrically powered hand-held jig saw.

It is yet another object of the present invention to provide a device of the aforesaid nature of sturdy construction and amenable to low cost manufacture.

These objects and other objects and advantages of the invention will be apparent from the following description.

SUMMARY OF THE INVENTION

The above and other beneficial objects and advantages are accomplished in accordance with the present invention by an attachment device for an electrically powered jig saw having a housing, a guide plate for enabling the jig saw to ride upon a flat work surface, and drive means for causing reciprocal motion of a saw blade in a straight line perpendicular to said guide plate, said attachment device comprising:

(a) a mounting plate of elongated configuration having forward, rear and side extremities, substantially flat upper and lower surfaces, an axis of symmetry in the direction of said elongation, a straight elongated slot centered upon said axis of symmetry and opening upon said forward extremity, and means for attachment to said jig saw, (b) paired identical elongated holding means disposed upon the upper surface of said mounting plate in parallel juxtaposition and spaced equidistantly from said elongated slot, (c) yoke means disposed upon the upper surface of said mounting plate adjacent said forward extremity and embracing said elongated slot, said yoke means having penetrating channels aligned upon a line parallel to said mounting plate and perpendicular to said slot, (d) a vertical bar having an upper extremity adapted to engage said drive means, and an apertured lower extremity, (e) a horizontal bar having apertured forward and rear extremities and disposed generally above said slot and parallel to said mounting plate, the rearward extremity of said horizontal bar pivotably engaging the lower extremity of said vertical bar, and (f) a cutting blade having substantially flat, parallel sides, an upper extremity, a lower extremity provided with opposed cutting edges, and upper and lower penetrating holes in vertically spaced relationship, said cutting blade being vertically disposed between said yoke means and pivotably joined thereto by a pivot pin extending through the channels of said yoke means and the lower penetrating hole of said blade, the manner of said pivotable joinder permitting the lower extremity of the blade to protrude through said slot below said mounting plate, said blade being pivotably attached at its upper hole to the forward extremity of said horizontal bar, whereby (g) reciprocal motion applied by said drive means to said vertical bar causes the cutting edges of the blade to oscillate in a circular arc.

In a preferred embodiment, the yoke means is comprised of two blocks having facing flat surfaces which serve as constraining means for the cutting blade which makes sliding contact with said facing surfaces.

BRIEF DESCRIPTION OF THE DRAWINGS

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
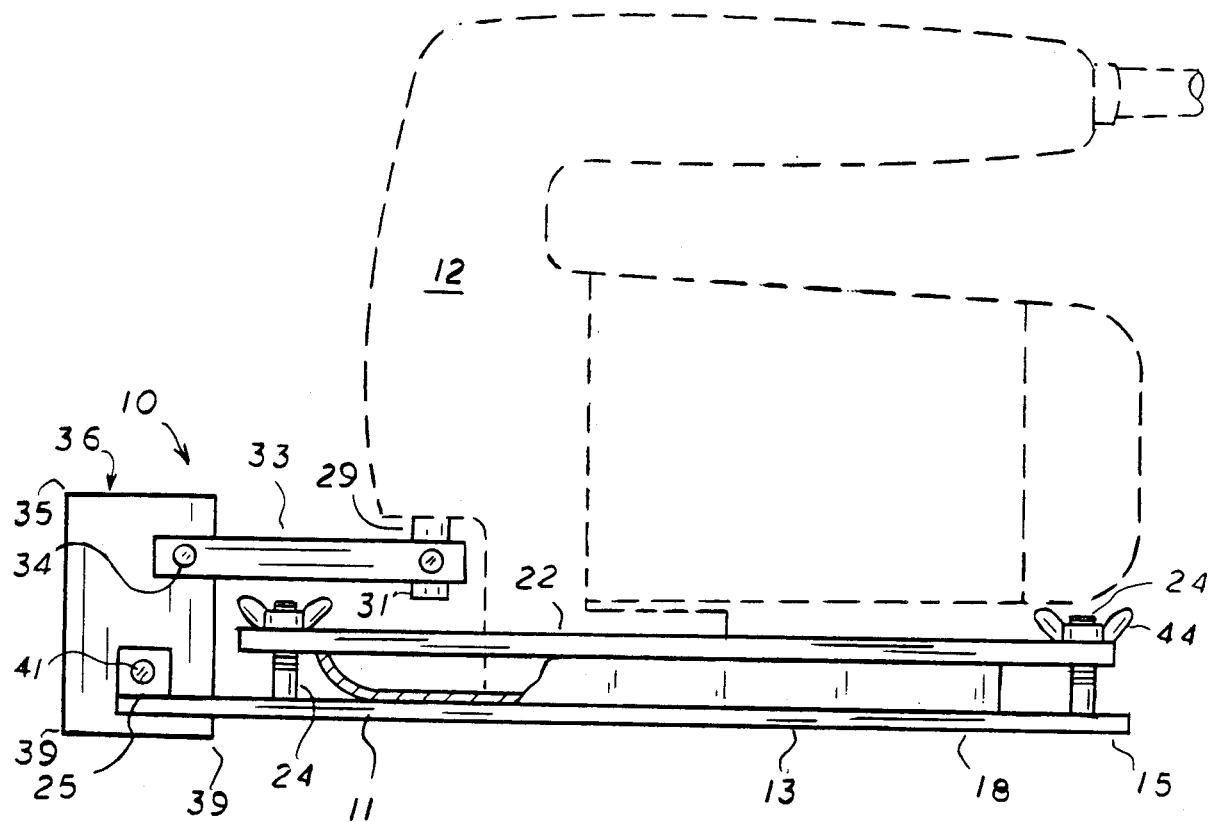
FIG. 1 is a side view of an embodiment of the device of this invention shown in functional engagement with a conventional jig saw.
Figure 2:
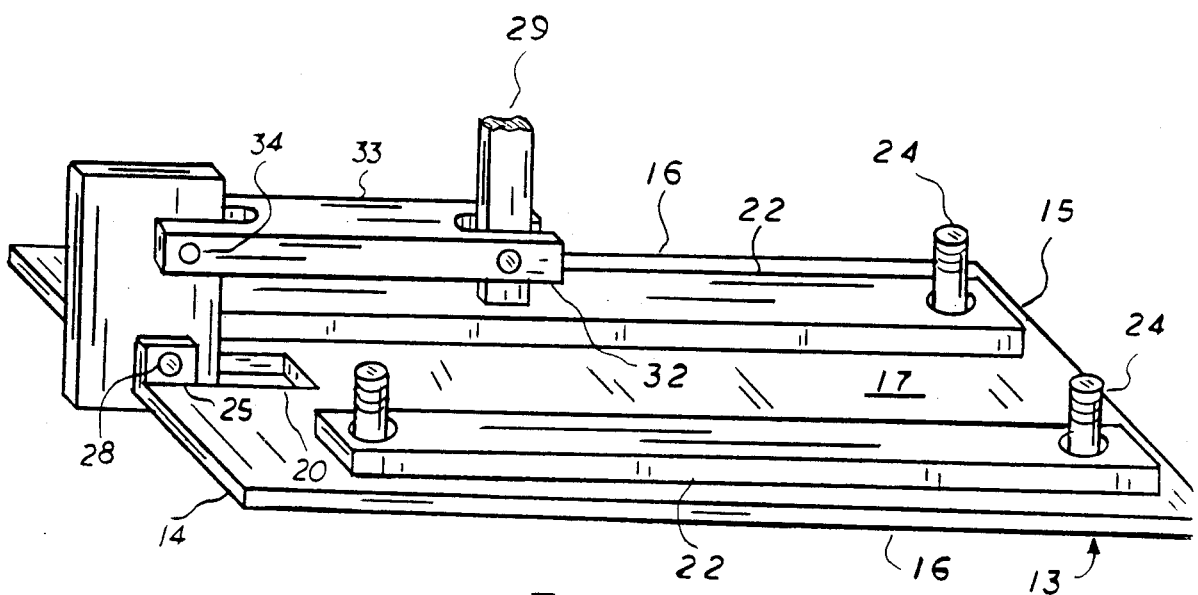
FIG. 2 is a top perspective view of the device of FIG. 1.
Figure 3:
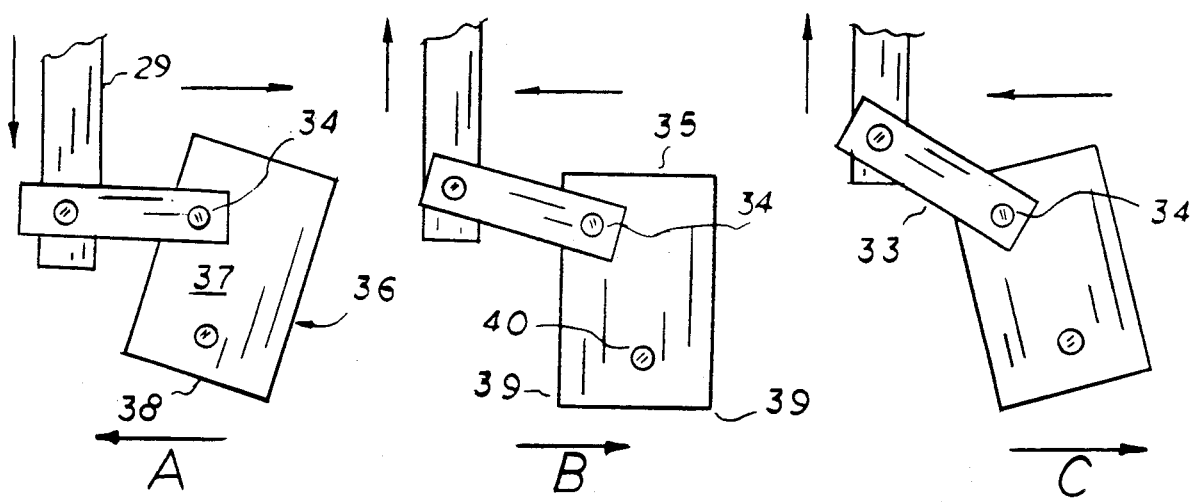
FIGS. 3A, 3B and 3C are schematic side views of the moving components of the device illustrating the mode of motion.
Figure 5:
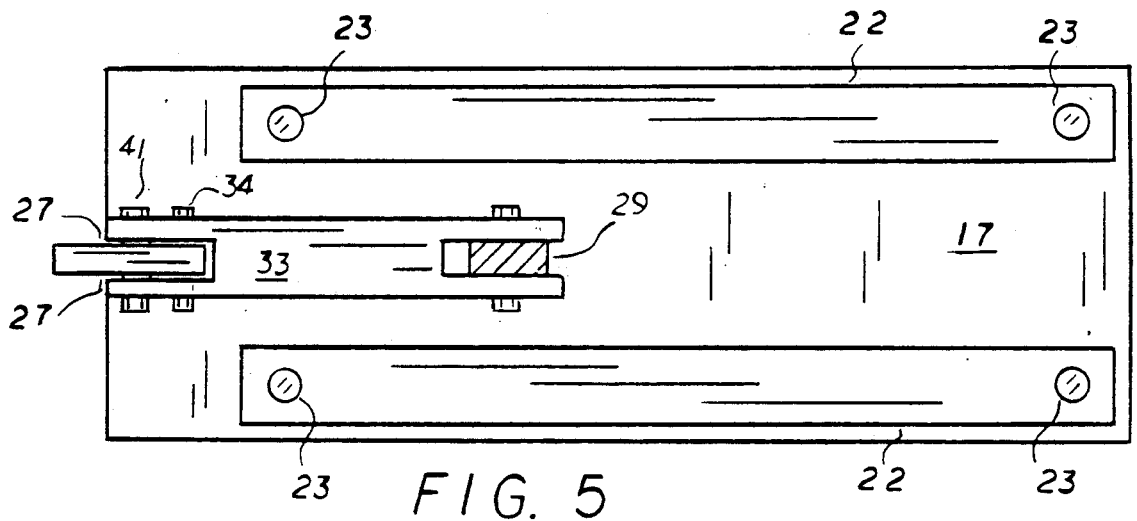
FIG. 5 is a top view of the device.
Figure 4:
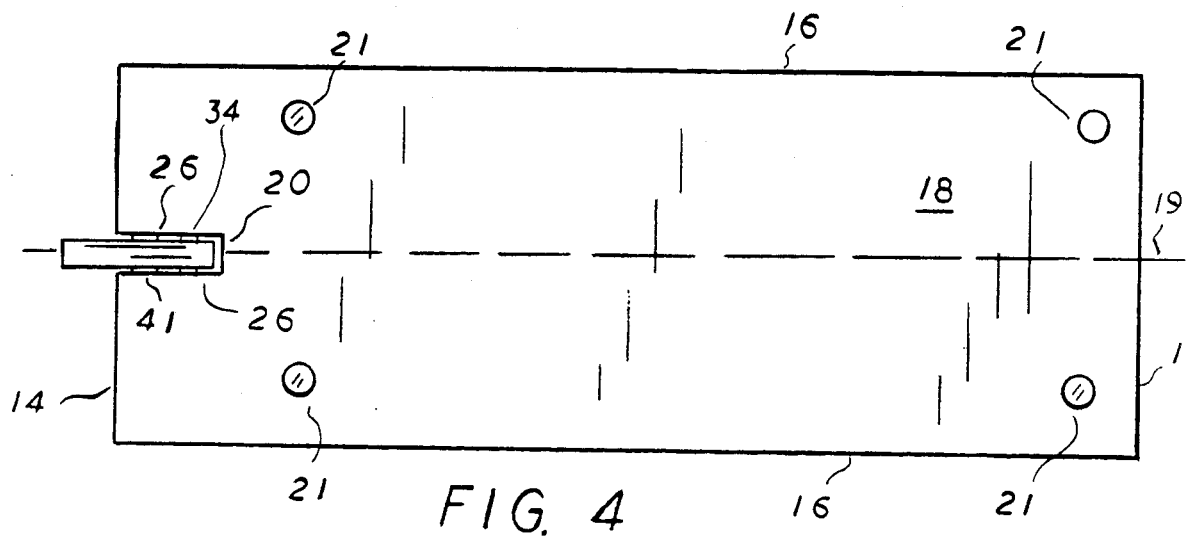
FIG. 4 is a bottom view of the device.

Referring to FIG. 1, an embodiment of the device 10 of the present invention is shown attached to the underside of the guide plate 11 of a hand-holdable electrically powered jigsaw 12.

The device, as further illustrated in FIGS. 2-5 is comprised of a mounting plate 13 of elongated rectangular configuration having forward, rear and side edge extremities 14, 15 and 16, respectively, and substantially flat upper and lower surfaces 17 and 18, respectively. The mounting plate is symmetrical about an axis 19 that bisects the plate in parallel relationship to side edge extremities 16. A straight slot 20 having parallel longitudinal edges 26 is centered upon axis 19, and opens upon forward extremity 14. Four threaded posts 24 are anchored in mounting plate 13 and directed upwardly therefrom in a rectangular array.

Holding means in the form of paired identical elongated blocks 22 are disposed above upper surface 17 of mounting plate 13 in parallel juxtaposition and spaced equidistantly from opposite sides of slot 20. Said blocks 22 contain channels 23 aligned to permit penetration by threaded posts 24. By disposing guideplate 11 between mounting plate 13 and blocks 22, and employing wing nuts 44 upon the protruding extremities of posts 24, guide plate 11 is caused to be securely held in sandwiched relationship.

Yoke means in the form of paired confining blocks 25 are disposed upon the upper surface 17 of said mounting plate adjacent forward extremity 14. Said confining blocks have flat facing surfaces 27 aligned with longitudinal edges 26 of said slot. Penetrating channels 28 are disposed within blocks 25 aligned upon a line parallel to mounting plate 13 and perpendicular to slot 20.

It is to be understood that mounting plate 13 and yoke blocks 25 may be components of an integral monolithic structure fabricated of metal or engineering grade plastic.

A vertical bar 29 is attached at its upper extremity to the drive means of the jig saw, the manner of attachment being the same as the usual mode of attachment of saw blades to said drive means. The lower extremity 31 of the vertical bar pivotably engages the bifurcated rear extremity 32 of horizontal bar 33 disposed above slot 20 and generally parallel to mounting plate 13. The forward extremity of horizontal bar 33 is also bifurcated, and is attached by reciprocating pivot pin 34 to the upper extremity 35 of cutting blade 36. Said cutting blade is further comprised of flat parallel sides 37, lower extremity 38 having opposed cutting edges or corners 39, and lower penetrating hole 40 in substantially vertically spaced relationship with pivot pin 34. Cutting blade 36 is held between confining blocks 25 by stationary pivot pin 41 which penetrates channels 28 and hole 40. The sides 37 of blade 36 are spaced sufficiently close to the facing surfaces 27 of blocks 25 as to make sliding contact therewith. Blade 36 is further positioned so that both cutting edges 39 are disposed below lower surface 18 of mounting plate 13. In the illustrated preferred embodiment, the forwardmost of cutting edges 39 extends forwardly of forward extremity 14 of said mounting plate. In a further preferred embodiment, reciprocating pivot pin 34 is located slightly rearwardly of stationary pivot pin 41.

As shown in FIG. 3A, when the drive means of the jig saw is in its lowermost position, pivot pin 34 urges the upper extremity of blade 36 forwardly. When the drive means begins to rise, as shown in FIG. 3B, the upper extremity of blade 36 reverses its direction of travel. At the uppermost position of the drive means, as shown in FIG. 3C, the position of the blade is opposite to the position it had in FIG. 3A. Such motion of the blade causes cutting edges 39 to move in an oscillating manner in a short-distanced curved path. The nature of such path of motion is found to be eminently suited for pulverizing grout in a safe and controllable manner.

While particular examples of the present invention have been shown and described, it is apparent that changes and modifications may be made therein without departing from the invention in its broadest aspects. The aim of the appended claims, therefore, is to cover all such changes and modifications as full within the true spirit and scope of the invention.

Having thus described our invention, what is claimed is:

1. An attachment device for an electrically powered jig saw having a housing, a guide plate for enabling the jig saw to ride upon a flat work surface, and drive means for causing reciprocal motion of a saw blade in a straight line perpendicular to said guide plate, said attachment device comprising:
   (a) a mounting plate of elongated configuration having forward, rear and side extremities, substantially flat upper and lower surfaces, an axis of symmetry in the direction of said elongation, a straight elongated slot centered upon said axis of symmetry and opening upon said forward extremity, and means for attachment to said jig saw,
   (b) holding means disposed upon the upper surface of said mounting plate,
   (c) yoke means disposed upon the upper surface of said mounting plate adjacent said forward extremity and embracing said elongated slot, said yoke means having penetrating channels aligned upon a line parallel to said mounting plate and perpendicular to said slot,
   (d) a vertical bar having an upper extremity adapted to engage said drive means, and a lower extremity,
   (e) a horizontal bar having forward and rear extremities and disposed generally above said slot and parallel to said mounting plate, the rearward extremity of said horizontal bar pivotably engaging the lower extremity of said vertical bar, and
   (f) a cutting blade having substantially flat parallel sides, an upper extremity, a lower extremity provided with opposed cutting edges, and upper and lower holes in substantially vertically spaced relationship, said cutting blade being vertically disposed between said yoke means and pivotably joined thereto by a stationary pivot pin extending through the channels of said yoke means and the lower penetrating hole of said blade, the manner of said pivotable joinder permitting the lower extremity of the blade to protrude through said slot below said mounting plate, said blade being pivotably attached at its upper hole to the forward extremity of said horizontal bar, whereby (g) reciprocal motion applied by said drive means to said vertical bar causes the cutting edges of the blade to oscillate in a circular arc.

2. The device of claim 1 wherein the upper hole of said cutting blade is located slightly rearwardly of said lower hole.

3. The device of claim 1 wherein said holding means are comprised of paired identical elongated blocks in parallel juxtaposition and spaced equidistantly from said elongated slot.

4. The device of claim 1 wherein said means for attachment to said jig saw comprise threaded posts anchored in said mounting plate and directed upwardly therefrom.

5. The device of claim 4 wherein four threaded posts are utilized in a rectangular array and adapted to penetrate said holding means.

* * * * *